(No Model.)
E. PARKER.
MUZZLE.
No. 265,860. Patented Oct. 10, 1882.
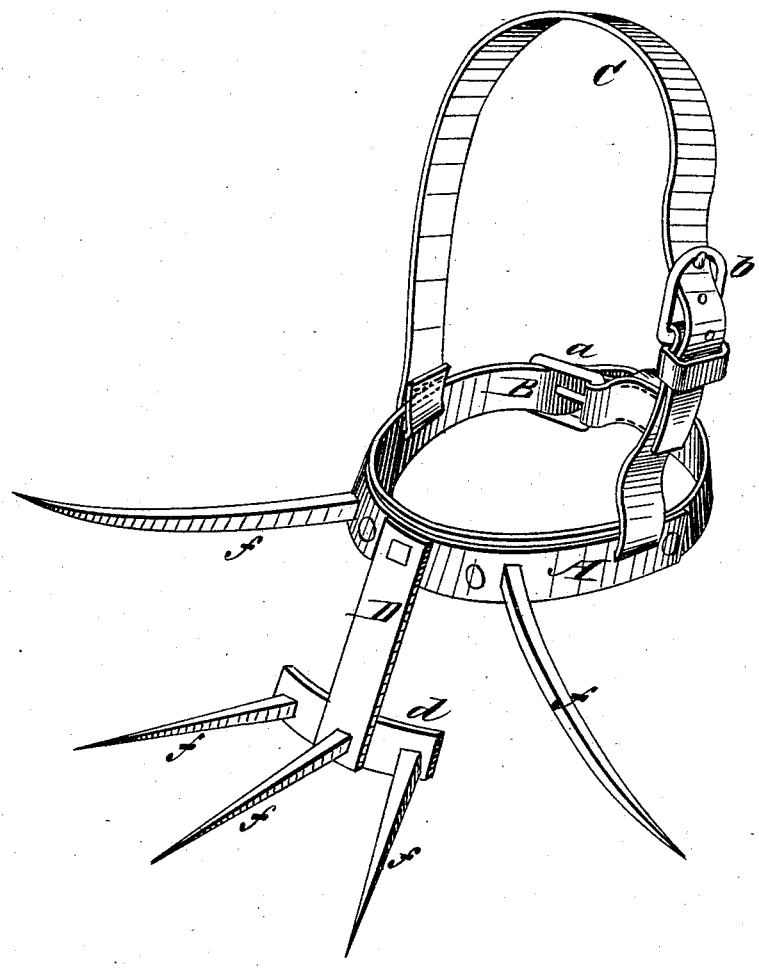
WITNESSES:
Francis McArdle.
C. Sedgwick
INVENTOR:
E. Parker
BY Munn & Co
ATTORNEYS.

UNITED STATES PATENT OFFICE.

EDWIN PARKER, OF COUNCIL BLUFFS, IOWA.

MUZZLE.

SPECIFICATION forming part of Letters Patent No. 265,860, dated October 10, 1882.

Application filed August 2, 1882. (No model.)

*To all whom it may concern:*

Be it known that I, EDWIN PARKER, of Council Bluffs, in the county of Pottawattamie and State of Iowa, have invented a new and Improved Calf and Cow Muzzle, of which the following is a full, clear, and exact description:

The object of my invention is to provide a device for muzzling calves and cows in order to prevent them obtaining milk, and at the same time allow them to feed on grass.

Reference is to be had to the accompanying drawing, which shows my improved muzzle by a perspective view.

A is a strip or band, of metal, bent in curved or semicircular form and attached, by square rivets to a strap, B. One end of the strap is provided with a buckle, *a*, for its attachment. A second strap, C, provided with a buckle, *b*, is attached at its ends to the band A. This strap C will pass over the animal's head behind its ears, while the strap B will pass beneath the animal's jaw, so that the band A will be held securely in place upon the animal's nose.

D is a metal strip, securely attached to the band A and projecting downward, and fitted at its lower end with a cross-piece, *d*, from which metal spikes *f* project. Similar spikes are also attached to the band A, and these spikes are to be made of malleable metal, so that they can be bent as required.

The muzzle, being attached to a calf, effectually prevents it from obtaining milk from the mother, without interfering with its feeding on grass. The muzzle can also be applied to cows for breaking or preventing the habit of sucking milk.

This device is inexpensive and thoroughly effective, while it does not punish the animal nor retard its growth. The muzzle is adjustable to fit the animal, as is required, on account of the variations in size, so that only two sizes are required—one for calves and the other for cows.

Having thus fully described my invention, I claim as new and desire to secure by Letters Patent—

The combination, with buckle-straps B C, of a metallic spike-band, A, and a metallic strip, D, having a spiked cross-strip, the whole adapted to prevent animals from sucking, as described.

EDWIN PARKER.

Witnesses:
C. F. CUMMINGS,
P. L. ANDROUS.